United States Patent
Ramb et al.

(10) Patent No.: US 11,111,812 B2
(45) Date of Patent: Sep. 7, 2021

(54) TURBINE ARRANGEMENT FOR AN EXHAUST GAS TURBOCHARGER

(71) Applicant: BorgWarner Inc., Auburn Hills, MI (US)

(72) Inventors: Thomas Ramb, Worms (DE); Gerald Schall, Bobenheim-Roxheim (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 16/954,611

(22) PCT Filed: Dec. 17, 2018

(86) PCT No.: PCT/US2018/066003
§ 371 (c)(1),
(2) Date: Jun. 17, 2020

(87) PCT Pub. No.: WO2019/126036
PCT Pub. Date: Jun. 27, 2019

(65) Prior Publication Data
US 2020/0332674 A1 Oct. 22, 2020

(30) Foreign Application Priority Data
Dec. 18, 2017 (DE) .......................... 102017223067.3

(51) Int. Cl.
*F01D 17/16* (2006.01)
*F02B 37/24* (2006.01)
*F02C 6/12* (2006.01)

(52) U.S. Cl.
CPC ............ *F01D 17/165* (2013.01); *F02B 37/24* (2013.01); *F02C 6/12* (2013.01); *F05D 2220/40* (2013.01)

(58) Field of Classification Search
CPC ........ F02B 37/22; F02B 37/24; F01D 17/165; F02C 6/12; F05D 2220/40; Y02T 10/12
See application file for complete search history.

(56) References Cited

U.S. PATENT DOCUMENTS

2004/0081567 A1* 4/2004 Boening ............... F01D 17/165
417/406
2013/0170976 A1 7/2013 Ramb et al.
(Continued)

FOREIGN PATENT DOCUMENTS

WO 2012/040039 A2 3/2012

OTHER PUBLICATIONS

International Search Report of the International Searching Authority for PCT/US2018/066003 dated Apr. 17, 2019.

*Primary Examiner* — Audrey K Bradley
*Assistant Examiner* — Edward Bushard
(74) *Attorney, Agent, or Firm* — Howard & Howard Attorneys PLLC

(57) ABSTRACT

A turbine arrangement for an exhaust gas turbocharger includes a turbine housing, a turbine wheel that is arranged in the turbine housing and has an axis of rotation, and a variable turbine geometry arrangement (VTG arrangement). The VTG arrangement includes a bearing ring, a disc, multiple vanes rotatably mounted in the bearing ring, and a contour sleeve that is coupled with the disc. The turbine housing comprises an axial stop, against which the contour sleeve stops in order to secure the VTG arrangement in an axial direction within the turbine housing.

19 Claims, 1 Drawing Sheet

(56) References Cited

U.S. PATENT DOCUMENTS

| | | | |
|---|---|---|---|
| 2014/0186171 A1* | 7/2014 | Naunheim | F01D 17/165 415/208.1 |
| 2014/0248137 A1* | 9/2014 | Inoue | F01D 17/165 415/159 |
| 2015/0125275 A1* | 5/2015 | Ueda | F02B 37/24 415/158 |
| 2018/0045106 A1* | 2/2018 | Musil | F01D 5/043 |

\* cited by examiner

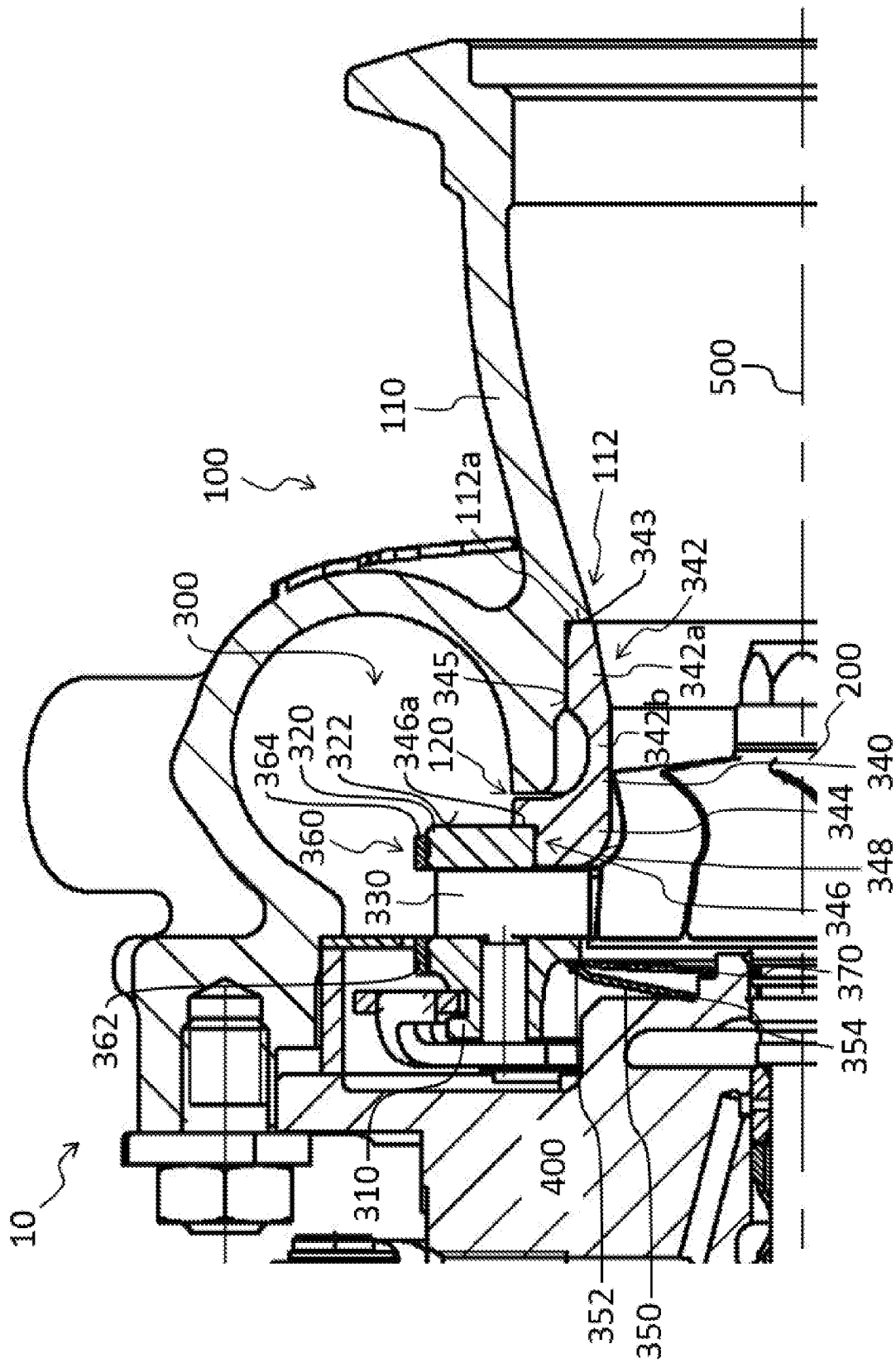

TURBINE ARRANGEMENT FOR AN EXHAUST GAS TURBOCHARGER

CROSS-REFERENCE TO RELATED APPLICATIONS

The present application is the National Stage of International Patent Application No. PCT/US2018/066003 filed on Dec. 17, 2018, which claims priority to and all the benefits of German Patent Application No. 102017223067.3 filed Dec. 18, 2017, which are hereby expressly incorporated herein by reference in their entirety.

FIELD OF THE INVENTION

The present invention relates to a turbine arrangement for an exhaust gas turbocharger as well as an exhaust gas turbocharger comprising a corresponding turbine arrangement.

BACKGROUND OF THE INVENTION

An increasing number of the latest generation of vehicles are being equipped with turbocharging devices. In order to fulfill design goals and legal requirements, it is important to develop advances optimizing reliability and efficiency in the entire powertrain and its individual components as well as in the system as a whole.

Exhaust gas turbochargers are known, for example, in which the flow of exhaust gas from a combustion engine drives a turbine comprising a turbine wheel. A compressor comprising a compressor wheel, which is arranged on a common shaft together with the turbine wheel, compresses fresh intake air for the engine that is drawn in through an intake line. Doing so increases the quantity of air, or rather oxygen, available to the engine, which in turn causes an increase in the performance of the combustion engine.

Turbines can also be used when decoupled from the exhaust turbocharger or, for example, in combination with an air supply for a fuel cell engine.

Since these turbines are driven by the flow of exhaust gas, very high temperatures occur in the area of the turbine wheel and the turbine housing. In turbines with variable turbine geometry (VTG), very high temperatures are reached not only in the turbine housing, but also in the VTG arrangement located in the interior of the turbine which, for example, comprises a vane bearing ring upon which a plurality of vanes are adjustably mounted. High temperatures in the turbine housing and in the components of the VTG arrangement can causing warping as a result of thermal expansion. Said warping of the turbine housing and the VTG arrangement thus interferes with the desire to keep vane clearance in the vanes of the VTG arrangement as small as possible since the vane clearance must be designed to be large enough to prevent the vanes from jamming.

Therefore, an object of the present invention is to provide a turbine arrangement comprising a VTG arrangement and permitting lower vane clearance in comparison to the known solutions.

SUMMARY OF THE INVENTION

The present invention relates to a turbine arrangement for an exhaust gas turbocharger according to claim 1 and an exhaust gas turbocharger according to claim 15.

The turbine arrangement according to the invention comprises a turbine housing, a turbine wheel that is arranged in the turbine housing and has an axis of rotation, and a variable turbine geometry arrangement (VTG arrangement) comprising a bearing ring, a disc, multiple vanes rotatably mounted in the bearing ring, said vanes arranged between the bearing ring and the disc, and a contour sleeve that is coupled with the disc. The turbine housing comprises an axial stop, against which the contour sleeve stops in order to secure the VTG arrangement in an axial direction within the turbine housing. It is possible by means of this special arrangement and design of the VTG arrangement comprising a contour sleeve to reduce vane clearance in the turbine arrangement according to the invention. The further advantage of the turbine according to invention is that the VTG arrangement can be assembled in an axial direction in a straightforward manner since all components of the VTG arrangement, including the contour sleeve, can be successively placed in the turbine housing and subsequently secured together. As a result, it is possible to provide a (partially) automated assembly process. A (partially) automatic assembly process can substantially reduce the manufacturing costs of a mass-produced product of this kind.

In embodiments, a securing means can also be provided, said securing means being arranged in an axial direction between the VTG arrangement and a turbine rear wall. A radially outward end of the securing means can lie against the bearing ring, and a radially inward end can lie against the turbine rear wall. The securing means can be in the form of a disc spring. A heat shield can be clamped between the securing means and the bearing ring. The turbine rear wall can be in the form of a portion of a bearing housing.

In embodiments able to be combined with all of the embodiments described thus far, the stop can be designed as a circumferential step in an outlet channel of the turbine housing.

In embodiments able to be combined with all of the embodiments described thus far, the front face of the contour sleeve can interact with a radial stop surface of the stop. The contour sleeve can comprise a cylinder section and an annular section, whereby the annular section adjoins the disc. The front face can be formed on an axial end of the cylinder section. The cylinder section can comprise an end area and an intermediate area, whereby the intermediate area is arranged between the end area and the annular section. A wall thickness of the contour sleeve can be smaller in the intermediate area than in the end area. The wall thickness can be smaller in the intermediate area than in the ring area. By means of the reduced wall thickness of the contour sleeve in the intermediate area, meaning an area between the annular section that is coupled with the disc, and the area of the contour sleeve that is in contact with the stop in the turbine housing, warping (as a result of thermal expansion) is prevented from propagating from the turbine housing to the ring area and hence to the disc (and from there to the securing mechanism of the VTG arrangement). The reduced wall thickness in the intermediate area can thus be referred to as an expansion cross section since the deformations or distortions that are transferred from the end area of the turbine housing to the cylinder section of the contour sleeve are not transferred or are only transferred in a reduced manner via the expansion cross section to the annular section. Doing so has the advantageous result of being able to reduce the gap between the contour sleeve in the annular section and the turbine wheel as well as the vane clearance of the vanes between the bearing ring and the disc. The end area of the contour sleeve can be radially fixed via a radially outward circumferential surface in the turbine housing.

In embodiments able to be combined with all of the embodiments described thus far, a gap can be formed in an axial direction between the annular section of the contour sleeve and the turbine housing. By means of this gap, the contour sleeve is decoupled from the turbine housing in this area. By means of said decoupling, the temperature-related warping of the turbine housing is unable to transfer in this area to the annular section of the contour sleeve and, therefore, not to the disc, as a result of which the vane clearance can be kept at a minimum.

In embodiments able to be combined with all of the embodiments described thus far, the contour sleeve and the disc can be in the form of one piece. Alternatively, the contour sleeve and the disc can be designed as two separate components. A radially outward area of the contour sleeve can comprise a step, whereby the disc is arranged in the area of said step. The disc can comprise ceramic material. In particular, the disc can be manufactured entirely from ceramic material. By means of a disc made of ceramic material, the vane clearance can be kept to a minimum since, in contrast to discs made of metal, said disc made of ceramic material does not oxidize, its thermal deformation is lower, and fewer deposits form on it. The smaller vane clearance in turn has an advantageous effect on the aerodynamics in this area, which results in increased performance for the VTG arrangement. In addition, mechanical hysteresis is reduced, as a result of which the response time of a turbocharger comprising the turbine arrangement according to the invention is reduced.

Moreover, in embodiments able to be combined with all of the embodiments described thus far, a front guide baffle can also be provided, whereby said front guide baffle can comprise a first annular element, which is coupled with the bearing ring, and a second annular element, which is coupled with the disc. Multiple spacers, in particular in the form of guide elements, can be arranged between the first annular element and the second annular element. The spacers of the inlet guide baffle ensure that the vanes of the VTG arrangement have sufficient clearance in order not to jam. As mentioned in the foregoing, the vane clearance can in an advantageous manner be kept to a bare minimum in combination with a disc made of ceramic material.

In embodiments able to be combined with all of the embodiments described thus far, at least 50%, more particularly at least 70%, and preferably at least 75% of the surface of a rear side of the disc can be left free. This arrangement has the advantage that (almost) no temperature gradients occur in the disc. As a consequence, the level of warping in the disc is held at a minimum. As a result of the limited warping, the vane clearance can be further reduced. A smaller vane clearance is accompanied by the advantages previously referred to.

In embodiments able to be combined with all of the embodiments described thus far, an inner surface of the contour sleeve, in particular in the area of the annular section, can be adapted to the contour of the turbine wheel.

The invention also includes an exhaust gas turbocharger for a combustion engine comprising a compressor and a turbine arrangement according to any of the previously described embodiments.

Additional details and features of the invention are described in reference to the following drawings.

BRIEF DESCRIPTION OF THE DRAWINGS

FIG. 1 shows a sectional view of an inventive turbine arrangement according to an exemplary embodiment.

DETAILED DESCRIPTION

Exemplary embodiments of the turbine arrangement 10 according to the invention are described hereinafter in reference to the drawings. In the context of this application, radial surfaces/planes are based upon surfaces/planes which are essentially orthogonal with respect to the axis of rotation 500 of the turbine wheel 200 of the turbine arrangement 10. The radial direction runs perpendicular to the direction of the axis of rotation 500; the axial direction runs parallel to the direction of the axis of rotation 500.

FIG. 1 shows a sectional view of an embodiment of the turbine arrangement 10 according to the invention. The turbine arrangement 10 comprises a turbine housing 100 and a turbine wheel 200, which is arranged in the turbine housing 100 and has an axis of rotation 500. A variable turbine geometry arrangement (VTG arrangement) 300 is arranged in the turbine housing 100. The VTG arrangement comprises a bearing ring 310, a disc 320, and multiple vanes 330 rotatably mounted in the bearing ring 310, whereby the vanes 330 are arranged between the bearing ring 310 and the disc 320. A contour sleeve 340 is coupled with the disc 320. The turbine housing 100 further comprises an axial stop 112, against which the contour sleeve 340 stops in order to secure the VTG arrangement 300 in an axial direction within the turbine housing 100. As shown in FIG. 1, the stop 112 can be designed as a circumferential step in the outlet canal 110 of the turbine housing 100.

By virtue of the high temperatures of the exhaust gases which are directed through the turbine housing 100 of the turbine arrangement 10, the turbine case 100 becomes very hot. As a result, temperature-related expansion of the material of the turbine housing 100 and a corresponding warping of the shape of the turbine housing 100 may take place. Warping of the turbine housing 100 that is transferred to the VTG arrangement 300 has undesirable consequences since the efficiency of the VTG arrangement 300 increases as the gap between the vanes 330 and the bearing ring 310, or rather the disc 320, is minimized (vane clearance). Consequently, any warping of the turbine housing 100 which has an impact on the VTG arrangement 300 impairs the performance of the turbine arrangement 10 since a correspondingly larger vane clearance must be provided in order to prevent the vanes 330 from jamming. By means of the special arrangement and design of the VTG arrangement 300 comprising the contour sleeve 340 in the turbine arrangement 10 according to the invention, these problems can be avoided or alleviated, so the vane clearance is able to be reduced. The further advantage of this turbine arrangement 10 is that the VTG arrangement 300 can be assembled in an axial direction in a straightforward manner since all components of the VTG arrangement 300, including the contour sleeve 340, can be successively placed in the turbine housing 100 and subsequently secured together. As a result, it is possible to provide a (partially) automated assembly process. A (partially) automatic assembly process can substantially reduce the manufacturing costs of a mass-produced product of this kind.

As can be gathered from FIG. 1, a securing means 350 is also provided. In the example shown, a disc spring is used as the securing means 350. The disc spring 350 is arranged in an axial direction between the VTG arrangement 300 and a turbine rear wall 400. The turbine rear wall 400 can in the form of a portion of a bearing housing. The radially outward end 352 of the disc spring 350 interacts with the bearing ring 310. The radially inward end 354 of the disc spring 350 lies against the turbine rear wall 400. As shown in FIG. 1, a heat shield 370 can be clamped between the disc spring 350 and the bearing ring 310.

To secure the contour sleeve 340, a front face 343 of the contour sleeve 340 lies against a radial stop surface 112a of the stop 112, whereby the term front face 343 is more precisely understood in the present case to mean a radial annular surface of the contour sleeve 340.

The contour sleeve 340 comprises a cylinder section 342 and an annular section 344. The annular section 344 adjoins the disc 320. The front face 343 is formed on the axial end of the cylinder section 342. In addition, the cylinder section 342 can be divided into an end area 342a and an intermediate area 342b, whereby the intermediate area 342b is arranged between the end area 342a and the annular section 344. As can also be gathered from FIG. 1, the wall thickness of the contour sleeve 340 is smaller in the intermediate area 342b than in the end area 342a. In addition, the wall thickness of the contour sleeve 340 in the intermediate area 342a is smaller than in the annular area 344. By means of the reduced wall thickness of the contour sleeve 320 in the intermediate area 342a, meaning an area between the ring section 344 that is coupled with the disc 320, and the area of the contour sleeve 340 that is in contact with the stop 112 in the turbine housing 100, warping (as a result of thermal expansion) is prevented from propagating from the turbine housing 100 to the annular area 344 and hence to the disc 320 (and from there to the securing mechanism of the VTG arrangement). The reduced wall thickness in the intermediate area 342a can thus be referred to as an expansion cross section since the deformations or distortions that are transferred from the end area 342a of the turbine housing 100 to the cylinder section 342 of the contour sleeve 340 are not transferred or are only transferred in a reduced manner via the expansion cross section to the annular section 344. Doing so has the advantageous result of being able to reduce the vane clearance of the vanes 330 between the bearing ring 310 and the disc 320 as well as the gap between the annular section 344 of the contour sleeve 340 and the turbine wheel 200. The latter is in particular important for being able to yet better utilize said advantageous effects, which are achieved by precisely adapting the inner surface 348 of the contour sleeve 340, in particular in the area of the annular section 344, to the contour of the turbine wheel 200 (see FIG. 1).

The end area 342a of the contour sleeve 340 is radially fixed via a radially outward circumferential surface 345 in the turbine housing 100. A clearance fit can be provided between the turbine housing 100 and the circumferential surface 345 in the end area 342a of the contour sleeve 340. This clearance fit is in particular advantageous for the assembly of the turbine arrangement 10. Warping of the turbine housing 100 in a radial direction from the end area 342a of the contour sleeve 340 can be accommodated via the clearance fit.

As is evident from FIG. 1, a gap 120 is formed in an axial direction between the annular section 344 of the contour sleeve 340 and the turbine housing 100. The gap 120 thereby extends across the entire circumference, so, by means of said gap 120, the contour sleeve 340 is decoupled from the turbine housing 100 in this area. By means of said decoupling, the temperature-related warping of the turbine housing 100 is unable to transfer in this area to the annular section 344 of the contour sleeve 340 and, therefore, not to the disc 320, as a result of which the vane clearance can be kept to a minimum. During operation of the turbine arrangement 10, deposits (e.g., soot particles) from the exhaust gas that is being directed through the turbine arrangement 10 can settle in this gap 120. In addition, these deposits along with the high temperatures can cause a degree of corrosion. As a consequence, this deposition and/or the corrosion products can lead to a (partial) sealing action for exhaust gases in the area of the gap 120. However, these deposits remain flexible enough to preserve the advantages from the decoupling of the annular section 344 of the contour sleeve 340 and, therefore, to preserve the disc 320 of the turbine housing 100 in this area.

As shown in the example in FIG. 1, the contour sleeve 340 and the disc 320 can be designed as two separate components. A radially outward area of the contour sleeve 340 can comprise a step 346, whereby the disc 320 is arranged in the area of said step 346. In other words, the disc 320 is held apart from the annular section 344 of the contour sleeve 340 in the area of the step 346 and lies in an axial direction against the radial side surface 346a of the step 346. The position of the disc 320 on the contour sleeve 340 is fixed by means of the axial securing of the entire VTG arrangement comprising the contour sleeve 340.

A ceramic material can be used for manufacturing the disc 320. In particular, the disc 320 can be manufactured entirely from ceramic material. For example, the disc 320 can be manufactured from aluminum oxide ($Al_2O_3$). By using a disc 320 made of ceramic material, the vane clearance can be kept to a minimum since, in contrast to discs made of metal, said disc 320 made of ceramic material does not oxidize, its thermal deformation is lower, and fewer deposits form on it. The smaller vane clearance in turn has an advantageous effect on the aerodynamics in this area, which results in increased performance for the VTG arrangement. In addition, mechanical hysteresis is reduced, as a result of which the response time of a turbocharger comprising the turbine arrangement 10 according to the invention is reduced.

In addition, the shape of the disc 320 can be adapted in order to better withstand the transmission of force from the contour sleeve 340, through the disc 320, and on through the front guide baffle 360 and the bearing ring 310 as well as, ultimately, via the disc spring 350 and into the bearing housing/turbine rear wall 400. In order to accomplish this, the ratio of length to width (with the length representing the height of the disc in cross-section and the width the thickness of the disc 320 in cross-section) is designed to be smaller in comparison to known discs for VTG arrangements. The length (height) of the disc in this case is chosen so as to provide a barely sufficient resting surface for the vanes 330 of the VTG arrangement 300 in the open position. The dimensions described in the foregoing in combination with both the contour sleeve 340 according to the invention and a placement of the disc 320 enable said dimensions to permit the forces for axially securing the VTG arrangement 300 in the turbine housing 100 via the disc 320 to be transmitted even if a disc 320 made of ceramic material is being used.

As an alternative to the previously described embodiment, the contour sleeve 340 and the disc 320 can also be in the form of one piece. In this case, it can be provided that the integral component comprising the contour sleeve 340 and the disc 320 is manufactured from ceramic material.

The example of the turbine arrangement 10 shown in FIG. 1 further comprises a front guide baffle 360, whereby said front guide baffle 360 comprises a first annular element 362, which is coupled with the bearing ring 310, and a second annular element 364, which is coupled with the disc 320. Multiple spacers, in particular in the form of guide elements, can be arranged between the first annular element 362 and the second annular element 364 (not visible in the FIG. 1 sectional view). As a consequence, the front guide baffle 360 serves the purpose of defining the spacing between the bearing ring 310 and the disc 320. The spacing between the bearing ring 310 and the disc 320 determines the axial vane clearance. In other words, the spacers of the inlet guide baffle 360 ensure that the vanes 330 of the VTG arrangement 300 have sufficient clearance in order not to jam. As mentioned in the foregoing, the vane clearance can in an advantageous manner be kept to a bare minimum in combination with a disc 320 made of ceramic material.

As an alternative or in addition to a front guide baffle, spacers can also be provided directly between the disc 320 and the bearing ring 310.

As can also be gathered from FIG. 1, the rear side 322 of the disc 320 is left free. The rear side 322 of the disc 320 is the side of the disc 320 facing away from the bearing ring 310, or rather the vanes 330. "Left free" means that the rear side of the disc does not lie against or adjoin the turbine housing 100 or any other component. The area of the rear side 322 of the disc 320 that is left free thus projects into the spiral chamber of the turbine housing 10 within the flow and apart from the exhaust gases. For example, at least 50%, more particularly at least 70%, and preferably at least 75% of the surface of the rear side 322 of the disc 320 can be left free. This arrangement with the disc 320 being left free has the advantage that (almost) no temperature gradients occur in the disc 320. As a consequence, the level of warping in the disc 320 is held at a minimum. As a result of the limited warping, the vane clearance can be further reduced. A smaller vane clearance is accompanied by the advantages for the turbine arrangement 10 previously referred to.

The invention further includes an exhaust gas turbocharger for a combustion engine comprising a compressor and a turbine arrangement according to any of the previously described embodiments.

Although the present invention has been described above and is defined in the appended claims, it should be understood that the invention may, as an alternative, also be defined in accordance with the following embodiments:

1. A turbine arrangement (10) for an exhaust gas turbocharger comprising a turbine housing (100);
   a turbine wheel (200), which is arranged in the turbine housing (100) and has an axis of rotation (500);
   a variable turbine geometry arrangement (VTG arrangement) (300) comprising
      a bearing ring (310);
      a disc (320); and
      multiple vanes (330) rotatably mounted in the bearing ring (310), said vanes arranged between the bearing ring (310) and the disc (320); and
   a contour sleeve (340) which is coupled with the disc (320);
   characterized in that the turbine housing (100) comprises an axial stop (112), against which the contour sleeve (340) stops in order to secure the VTG arrangement (300) in an axial direction within the turbine housing (100).
2. The turbine arrangement according to embodiment 1, characterized in that a securing means (350) is also provided, wherein said securing means (350) is arranged in an axial direction between the VTG arrangement and a turbine rear wall (400).
3. The turbine arrangement according to embodiment 2, characterized in that a radially outward end (352) of the securing means (350) lies against the bearing ring (310), and a radially inward end (354) lies against the turbine rear wall (400).
4. The turbine arrangement arrangement according to embodiment 2 or embodiment 3, characterized in that the securing means (350) is in the form of a disc spring.
5. The turbine arrangement arrangement according to embodiment 3 or embodiment 4, characterized in that a heat shield (370) is clamped between the securing means (350) and the bearing ring (310).
6. The turbine arrangement arrangement according to any of embodiments 2 to 5, characterized in that the turbine rear wall (400) is in the form of a portion of a bearing housing.
7. The turbine arrangement arrangement according to any of the previous embodiments, characterized in that the stop (112) is designed as a circumferential step in an outlet channel (110) of the turbine housing (100).
8. The turbine arrangement arrangement according to any of the previous embodiments, characterized in that a front face (343) of the contour sleeve (340) interacts with a radial stop surface (112a) of the stop (112).
9. The turbine arrangement according to embodiment 8, characterized in that the contour sleeve (340) comprises a cylinder section (342) and an annular section (344), wherein the annular section (344) adjoins the disc (320).
10. The turbine arrangement according to embodiment 9, characterized in that the front face (343) is formed on an axial end of the cylinder section (342).
11. The turbine arrangement according to embodiment 9 or embodiment 10, characterized in that the cylinder section (342) comprises an end area (342a) and an intermediate area (342b), wherein the intermediate area (342b) is arranged between the end area (342a) and the annular section (344).
12. The turbine arrangement according to embodiment 11, characterized in that the wall thickness of the contour sleeve (340) is smaller in the intermediate area (342b) than in the end area (342a).
13. The turbine arrangement according to embodiment 12, characterized in that the wall thickness in the intermediate area (342a) is smaller than in the annular area (344).
14. The turbine arrangement according to any of embodiments 11 to 13, characterized in that the contour sleeve (340) in the end area (342a) is radially fixed via a radially outward circumferential surface (345) in the turbine housing (100).
15. The turbine arrangement according to any of embodiments 9 to 14, characterized in that a gap (120) is formed in an axial direction between the annular section (344) of the contour sleeve (340) and the turbine housing (100).
16. The turbine arrangement according to any of the previous embodiments, characterized in that the contour sleeve (340) and the disc (320) are in the form of one piece.
17. The turbine arrangement according to any of embodiments 1 to 15, characterized in that the contour sleeve (340) and the disc (320) are designed as two separate components.
18. The turbine arrangement according to embodiment 17, characterized in that the radially outward area of the contour sleeve (340) comprises a step (346), wherein the disc (320) is arranged in the area of the step (346).
19. The turbine arrangement according to embodiment 17 or embodiment 18, characterized in that the disc (320) comprises ceramic material, in particular wherein the disc (320) is manufactured entirely from ceramic material.
20. The turbine arrangement according to any of the previous embodiments, characterized in that a front guide baffle (360) is also provided, wherein said front guide baffle (360) comprises a first annular element (362), which is coupled with the bearing ring (310), and a second annular element (364), which is coupled with the disc (320).

21. The turbine arrangement according to embodiment 20, characterized in that multiple spacers, in particular in the form of guide elements, are arranged between the first annular element (362) and the second annular element (364).

22. The turbine arrangement according to any of the previous embodiments, characterized in that at least 50%, more particularly at least 70%, and preferably at least 75% of the surface of a rear side (322) of the disc (320) is left free.

23. The turbine arrangement according to any of the previous embodiments, characterized in that an inner surface (348) of the contour sleeve, in particular in the area of the annular section (344), is adapted to the contour of the turbine wheel (200).

24. An exhaust gas turbocharger for a combustion engine comprising a compressor and a turbine arrangement according to any of the previous embodiments.

The invention claimed is:

1. A turbine arrangement for an exhaust gas turbocharger comprising
    a turbine housing;
    a turbine wheel, which is arranged in the turbine housing and has an axis of rotation;
    a variable turbine geometry arrangement (VTG arrangement) comprising
        a bearing ring;
        a disc; and
    multiple vanes rotatably mounted in the bearing ring, said vanes arranged between the bearing ring and the disc; and
        a contour sleeve which is coupled with the disc;
    characterized in that the turbine housing comprises an axial stop, against which the contour sleeve stops in order to secure the VTG arrangement in an axial direction within the turbine housing, wherein the contour sleeve comprises a cylinder section and an annular section, wherein the annular section adjoins the disc and the cylinder section comprises an end area and an intermediate area, and wherein the intermediate area is arranged between the end area and the annular section and a wall thickness of the contour sleeve is smaller in the intermediate area than in the end area.

2. The turbine arrangement according to claim 1, characterized in that a front face of the contour sleeve interacts with a radial stop surface of the stop.

3. The turbine arrangement according to claim 1, characterized in that the contour sleeve and the disc are in the form of one piece.

4. The turbine arrangement according to claim 1, characterized in that a front guide baffle is also provided, wherein said front guide baffle comprises a first annular element, which is coupled with the bearing ring, and a second annular element, which is coupled with the disc; and wherein multiple spacers, in particular in the form of guide elements, are arranged between the first annular element and the second annular element.

5. The turbine arrangement according to claim 1, characterized in that at least 50%, more particularly at least 70%, and preferably at least 75% of the surface of a rear side of the disc is left free.

6. The turbine arrangement according to claim 1, characterized in that a securing means is also provided, wherein said securing means is arranged in an axial direction between the VTG arrangement and a turbine rear wall.

7. The turbine arrangement according to claim 6, characterized in that the securing means is in the form of a disc spring.

8. The turbine arrangement according to claim 6, characterized in that a front face of the contour sleeve interacts with a radial stop surface of the stop.

9. The turbine arrangement according to claim 6, characterized in that the contour sleeve comprises a cylinder section and an annular section, wherein the annular section adjoins the disc.

10. The turbine arrangement according to claim 6, characterized in that a radially outward end of the securing means lies against the bearing ring, and a radially inward end lies against the turbine rear wall.

11. The turbine arrangement according to claim 10, characterized in that the securing means is in the form of a disc spring.

12. The turbine arrangement according to claim 1, characterized in that the contour sleeve and the disc are designed as two separate components.

13. The turbine arrangement according to claim 12, characterized in that the disc comprises ceramic material, in particular wherein the disc is manufactured entirely from ceramic material.

14. The turbine arrangement according to claim 1, characterized in that a gap is formed in an axial direction between the annular section of the contour sleeve and the turbine housing.

15. An exhaust gas turbocharger for a combustion engine comprising a compressor and a turbine arrangement comprising
    a turbine housing;
    a turbine wheel, which is arranged in the turbine housing and has an axis of rotation;
    a variable turbine geometry arrangement (VTG arrangement) comprising
        a bearing ring;
        a disc; and
    multiple vanes rotatably mounted in the bearing ring, said vanes arranged between the bearing ring and the disc; and
        a contour sleeve which is coupled with the disc;
    characterized in that the turbine housing comprises an axial stop, against which the contour sleeve stops in order to secure the VTG arrangement in an axial direction within the turbine housing, and wherein the contour sleeve comprises a cylinder section and an annular section, wherein the annular section adjoins the disc and the cylinder section comprises an end area and an intermediate area, and wherein the intermediate area is arranged between the end area and the annular section and a wall thickness of the contour sleeve is smaller in the intermediate area than in the end area.

16. The exhaust gas turbocharger according to claim 15, characterized in that a securing means is also provided, wherein said securing means is arranged in an axial direction between the VTG arrangement and a turbine rear wall.

17. The exhaust gas turbocharger according to claim 16, characterized in that a radially outward end of the securing means lies against the bearing ring, and a radially inward end lies against the turbine rear wall.

18. The exhaust gas turbocharger according to claim 16, characterized in that the securing means is in the form of a disc spring.

19. A turbine arrangement for an exhaust gas turbocharger comprising
- a turbine housing;
- a turbine wheel, which is arranged in the turbine housing and has an axis of rotation;
- a variable turbine geometry arrangement (VTG arrangement) comprising
  - a bearing ring;
  - a disc; and
- multiple vanes rotatably mounted in the bearing ring, said vanes arranged between the bearing ring and the disc; and
- a contour sleeve which is coupled with the disc;
- characterized in that the turbine housing comprises an axial stop, against which the contour sleeve stops in order to secure the VTG arrangement in an axial direction within the turbine housing, and characterized in that a front guide baffle is also provided, wherein said front guide baffle comprises a first annular element, which is coupled with the bearing ring, and a second annular element, which is coupled with the disc; and wherein multiple spacers, in particular in the form of guide elements, are arranged between the first annular element and the second annular element.

* * * * *